United States Patent
Huang

(10) Patent No.: US 10,055,812 B1
(45) Date of Patent: Aug. 21, 2018

(54) SYSTEMS, APPARATUSES AND METHODS FOR IMAGE MESH WARPING

(71) Applicant: Marvell International LTD., Hamilton (BM)

(72) Inventor: Samson Huang, Saratoga, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 58 days.

(21) Appl. No.: 15/250,270

(22) Filed: Aug. 29, 2016

Related U.S. Application Data

(60) Provisional application No. 62/267,504, filed on Dec. 15, 2015.

(51) Int. Cl.
*G06T 3/00* (2006.01)
*G06T 17/20* (2006.01)

(52) U.S. Cl.
CPC .......... *G06T 3/0093* (2013.01); *G06T 3/0012* (2013.01); *G06T 17/20* (2013.01); *G06T 2210/12* (2013.01)

(58) Field of Classification Search
None
See application file for complete search history.

(56) References Cited

U.S. PATENT DOCUMENTS

2006/0050074 A1* 3/2006 Bassi .................... G06T 3/0006
345/427

OTHER PUBLICATIONS

Anthony Thyssen "ImageMagick v6 Examples—Distorting Images", updated Mar. 2012, http://www.imagemagick.org/Usage/distorts/.*
Particle Incell,"Interpolation using an arbitrary quadrilateral", posted on Jun. 2012, https://www.particleincell.com/2012/quad-interpolation.*
Mili, "How to determine if a point is within a quadrilateral", posted Apr. 2013 https://stackoverflow.com/questions/5922027/how-to-determine-if-a-point-is-within-a-quadrilateral.*
Soumava Pal, Khang Nguyen Thanh, Akshay Yada, "British Flag Theorem" posted Mar. 24, 2015, https://brilliant.org/wiki/british-flag-theorem/.*

* cited by examiner

*Primary Examiner* — Sarah Le

(57) ABSTRACT

An image processing system defines an M×N grid for each of source and destination images. The system selects a pixel location in a grid location in the destination image. The system forms a bounding box using two diagonally opposite vertices of the grid location. The system forms a quadrilateral connecting vertices of the grid location. The system determines whether the selected pixel location falls inside or outside the quadrilateral in the bounding box. If the selected pixel location falls inside the quadrilateral in the bounding box, the system determines coordinates of the selected pixel location as percentages of two sides of the quadrilateral connected to one of the diagonally opposite vertices. The system locates a pixel in a corresponding grid location in the source image using the coordinates. The system maps the pixel found in the source image to the selected pixel location in the destination image.

12 Claims, 8 Drawing Sheets

SYSTEMS, APPARATUSES AND METHODS FOR IMAGE MESH WARPING

CROSS-REFERENCE TO RELATED APPLICATIONS

This application claims the benefit of U.S. Provisional Application No. 62/267,504, filed on Dec. 15, 2015. The entire disclosures of the applications referenced above are incorporated herein by reference.

FIELD

The present disclosure relates generally to image processing systems and particularly to a system and method for image mesh warping.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image mesh warping is used to create warped images as well as to correct image distortion. For example, warped images may be created from normal images for recreational purposes (e.g., to create funny faces). Images from wide-angle cameras (e.g., vehicle cameras, security cameras, etc.) may be distorted towards periphery. Such distortion can be corrected using image mesh warping.

Most image mesh warping methods involve extensive mathematical calculations. Accordingly, most image mesh warping methods require large amounts of processing time, processing power, and storage. As a result, most image mesh warping systems are expensive and yet slow. Reducing the amount of processing time, processing power, and storage are among the many challenges faced by today's image processing systems.

SUMMARY

A system comprises a pixel selecting module, an image processing module, and a pixel mapping module. The pixel selecting module is configured to select a first pixel from a first plurality of cells of a destination image. The first pixel is located in a first cell of the first plurality of cells of the destination image. The image processing module is configured to determine a bounding box around a quadrilateral formed by vertices of the first cell. The first pixel lies in the bounding box. The image processing module is configured to determine whether the first pixel is located in the quadrilateral. The image processing module is configured to determine, in response to the first pixel being located in the quadrilateral, coordinates of the first pixel relative to a first vertex of the vertices of the first cell. The pixel mapping module is configured to identify a second cell of a second plurality of cells of a source image corresponding to the first cell of the first plurality of cells of the destination image. The pixel mapping module is configured to locate a second pixel in the second cell using the coordinates of the first pixel. The pixel mapping module is configured to map the second pixel from the source image to the first pixel in the destination image.

In other features, the system further comprises a grid defining module configured to define a first grid including the first plurality of cells of the destination image and a second grid including the second plurality of cells of the source image.

In other features, the image processing module is further configured to determine whether the first pixel is located in the quadrilateral based on a first area of the quadrilateral and a second area of a sum of areas of triangles formed by connecting the vertices of the first cell to a location of the first pixel.

In another feature, the first plurality of cells and the second plurality of cells are equal in number.

In other features, the image processing module is further configured to determine the bounding box using the first vertex and a second vertex of the vertices of the first cell. The second vertex is diagonally opposite to the first vertex.

In other features, the image processing module is further configured to determine that the first pixel is located in the quadrilateral when a first area of the quadrilateral and a second area of a sum of areas of triangles formed by connecting the vertices of the first cell to a location of the first pixel.

In other features, the image processing module is further configured to determine the coordinates of the first pixel by determining a first percentage of a first length of a first side of the quadrilateral connected to the first vertex of the first cell, and a second percentage of a fourth length of a fourth side of the quadrilateral connected to the first vertex of the first cell.

In other features, the image processing module is further configured to determine the first percentage based on lengths of second and fourth sides of the quadrilateral and areas of first and second triangles of four triangles. The four triangles are formed by connecting the vertices of the first cell to a location of the first pixel. The first and second triangles respectively have the second and fourth sides as bases. The second side is connected to the first side and to a second vertex of the vertices of the first cell. The second vertex is diagonally opposite to the first vertex. The image processing module is further configured to determine the second percentage based on lengths of first and third sides of the quadrilateral and areas of third and fourth of the four triangles having the first and third sides as bases, where the third side is connected to the fourth side and to the second vertex of the first cell.

In still other features, an image processing method for transforming a source image into a destination image comprises selecting a first pixel from a first plurality of cells of a destination image, where the first pixel is located in a first cell of the first plurality of cells of the destination image. The method further comprises determining a bounding box around a quadrilateral formed by vertices of the first cell, where the first pixel lies in the bounding box. The method further comprises determining whether the first pixel is located in the quadrilateral. The method further comprises determining, in response to the first pixel being located in the quadrilateral, coordinates of the first pixel relative to a first vertex of the vertices of the first cell. The method further comprises identifying a second cell of a second plurality of cells of the source image corresponding to the first cell of the first plurality of cells of the destination image. The method further comprises locating a second pixel in the second cell using the coordinates of the first pixel. The method further comprises mapping the second pixel from the source image to the first pixel in the destination image.

In other features, the method further comprises defining a first grid including the first plurality of cells of the destination image, and defining a second grid including the second plurality of cells of the source image.

In other features, the method further comprises determining whether the first pixel is located in the quadrilateral based on whether an area of the area of the quadrilateral is equal to a sum of areas of triangles formed by connecting the vertices of the first cell to a location of the first pixel.

In another feature, the first plurality of cells and the second plurality of cells are equal in number.

In other features, the method further comprises determining the bounding box using the first vertex and a second vertex of the vertices of the first cell, where the second vertex is diagonally opposite to the first vertex.

In other features, the method further comprises determining that the first pixel is located in the quadrilateral when a first area of the quadrilateral and a second area of a sum of areas of triangles formed by connecting the vertices of the first cell to a location of the first pixel.

In other features, the method further comprises determining the coordinates of the first pixel by determining a first percentage of a first length of a first side of the quadrilateral connected to the first vertex of the first cell, and by determining a second percentage of a fourth length of a fourth side of the quadrilateral connected to the first vertex of the first cell.

In other features, the method further comprises determining the first percentage based on lengths of second and fourth sides of the quadrilateral and areas of first and second triangles of four triangles, where the four triangles are formed by connecting the vertices of the first cell to a location of the first pixel, the first and second triangles respectively have the second and fourth sides as bases, the second side is connected to the first side and to a second vertex of the vertices of the first cell, and the second vertex is diagonally opposite to the first vertex. The method further comprises determining the second percentage based on lengths of first and third sides of the quadrilateral and areas of third and fourth of the four triangles having the first and third sides as bases, where the third side is connected to the fourth side and to the second vertex of the first cell.

Further areas of applicability of the present disclosure will become apparent from the detailed description, the claims and the drawings. The detailed description and specific examples are intended for purposes of illustration only and are not intended to limit the scope of the disclosure.

DESCRIPTION

The present disclosure relates to a novel image mesh warping system and method. A user defines an M×N grid for a source image and a destination image. A pixel location is selected in a grid location in the destination image. The task is to find a pixel in the source image that can be mapped to the selected pixel location in the destination image. The task is performed as follows.

A quadrilateral connecting vertices of the grid location in the destination image is formed. A bounding box is formed using two diagonally opposite vertices of the quadrilateral. It is determined whether the selected pixel location falls inside or outside the quadrilateral in the bounding box as explained below. If the selected pixel location falls inside the quadrilateral in the bounding box, coordinates of the selected pixel location are determined as percentages of two sides of the quadrilateral connected to one of the diagonally opposite vertices as explained below. Thereafter, in a corresponding grid location in the source image, a pixel is located using the coordinates. The pixel found in the source image is mapped to the selected pixel location in the destination image. The task is repeated for all pixel locations in the destination image.

The tasks of determining whether the selected pixel location falls inside the quadrilateral and if so, determining the coordinates of the selected pixel location as percentages of two sides of the quadrilateral are performed using simple algorithms (explained below) that are easy to implement. As a result, the novel image mesh warping system and method of the present disclosure is less complex and more efficient in terms of processing time, processing power, and storage requirements than the prior art.

The present disclosure is not directed to merely manipulating image data using equations. Instead, the present disclosure is directed to significantly simplifying image processing by employing simple algorithms to determine when and how to determine coordinates of pixels of a destination image, and how to locate and map pixels from a source image to the destination image using the coordinates.

The novel methods of the present disclosure significantly simplify hardware design of graphical processors/accelerators and associated software used in a variety of image processing systems, which alleviates the problems of reducing processing time, processing power, and storage requirements faced by the prior art. For example, the system of the present disclosure can be implemented using a simple Application Specific Integrated Circuit (ASIC) or a field programmable gate array (FPGA) that can eliminate the need for a more powerful and expensive graphical processor/accelerator and associated software typically required to perform the complex image processing.

Figure 1A:
FIG. 1A shows an example of a rectangular mesh for a source image.
Figure 1B:
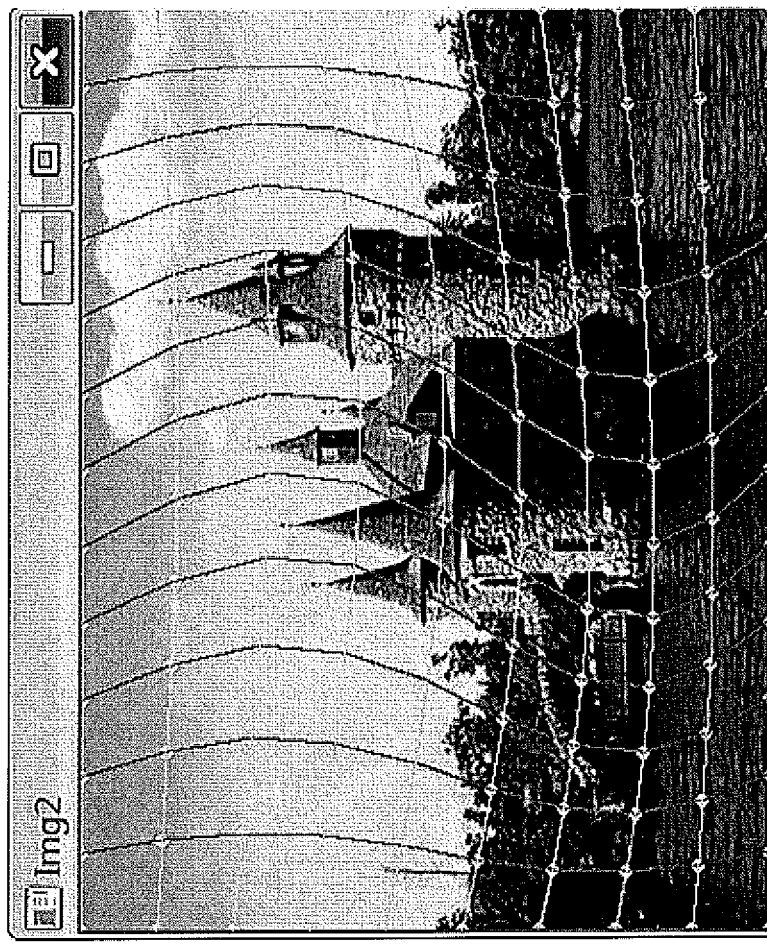
FIG. 1B shows an example of a warped mesh for a destination image.
Figure 1C:
FIG. 1C shows an example of a warped destination image generated by warping the source image.

FIG. 1A shows an example of a rectangular mesh for a source image. An M×N grid for the source image is defined using straight vertical and horizontal lines. FIG. 1B shows an example of a user-defined warped mesh for a destination image. An M×N grid for the destination image is defined using lines that are not straight (e.g., using curved or wavy lines as shown). FIG. 1C shows an example of a warped destination image that is generated after warping the source image.

Throughout the present disclosure, for example only, the source image is shown as undistorted (e.g., not warped), and the destination image is shown as distorted (e.g., warped). The teachings of the present disclosure are equally applicable if the source image is distorted (e.g., warped), and the destination image is undistorted (e.g., not warped).

In some instances, the distortion in a source image may include warping caused by an image producing apparatus (e.g., a wide-angle camera (e.g., vehicle cameras, security cameras, etc.)) and/or other distortion(s) associated with the image producing apparatus, which may be removed or significantly diminished to produce a destination image. Further, a source image may include an already warped image generated by the image producing apparatus (e.g., a wide-angle camera (e.g., vehicle cameras, security cameras, etc.)), which may be un-warped to produce an undistorted destination image.

The source image and the destination image may be stored in memory, displayed on a display, and/or printed on a printer. In other words, the source image and the destination image may be located in a variety of input and output devices including but not limited to memory, display, and/or printer.

Figure 2:
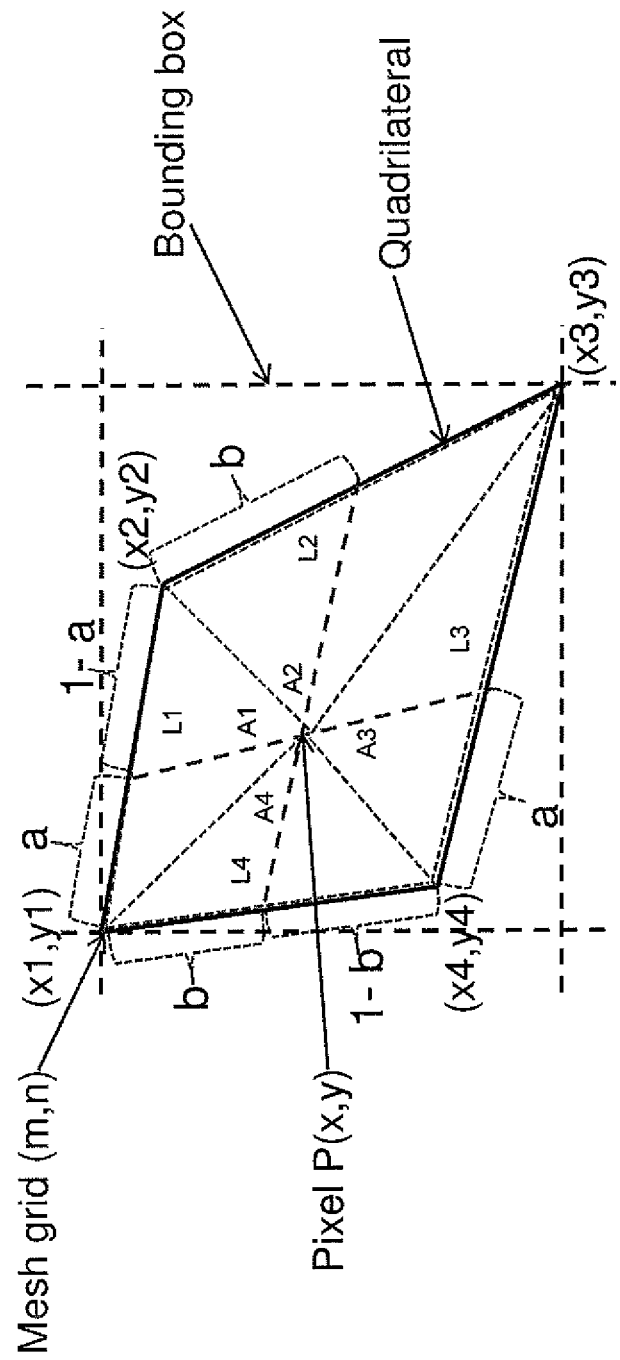
FIG. 2 shows a method for determining coordinates of a pixel located in a destination image according to the present disclosure.

FIG. 2 shows an example of a mesh warping method according to the present disclosure. Initially, the user defines an M×N grid for each of the source and destination images. Accordingly, both the source and destination images include equal number of grid locations (also called cells). A grid location is denoted as (m,n). Throughout the present disclosure, M, N, m, and n are integers greater than 1.

In the destination image, a pixel location P(x,y) is selected. For each pixel location P(x,y), a grid location (m,n) in which the pixel location P(x,y) falls is identified. The grid location (m,n) has four vertices: (x1,y1), (x2,y2), (x3,y3), and (x4,y4) as shown. Using the two diagonally opposite vertices (x1,y1) and (x3,y3), a bounding box is formed.

In geometry, a minimum or smallest bounding or enclosing box for a point set (S) in N dimensions is a box with a smallest measure (area, volume, or hypervolume in higher dimensions) within which all the points lie. A minimum bounding rectangle (MBR), also known as bounding box or envelope, is an expression of maximum extents of a 2-dimensional object (e.g., point, line, polygon) or set of objects within its (or their) 2-D (x, y) coordinate system; in other words, min(x), max(x), min(y), max(y). The MBR is a 2-dimensional case of the minimum bounding box.

A quadrilateral is formed by connecting the four vertices of the grid location (m,n). The quadrilateral has four sides of lengths L1, L2, L3, and L4. A first side connecting the vertices (x1,y1) and (x2,y2) has a length L1. A second side connecting the vertices (x2,y2) and (x3,y3) has a length L2. A third side connecting the vertices (x3,y3) and (x4,y4) has a length L3. A fourth side connecting the vertices (x4,y4) and (x1,y1) has a length L4.

Then it is determined whether the pixel location P(x,y) falls inside or outside the quadrilateral in the bounding box. The determination of whether the pixel location P(x,y) falls inside or outside the quadrilateral in the bounding box is made as follows.

Four triangles are formed by connecting the pixel location P(x,y) to the four vertices as shown. The triangle A1 has the first side of length L1 of the quadrilateral as base and the two lines connecting the pixel location P(x,y) to the two vertices (x1,y1) and (x2,y2) as two sides. The triangle A2 has the second side of length L2 of the quadrilateral as base and the two lines connecting the pixel location P(x,y) to the two vertices (x2,y2) and (x3,y3) as two sides. The triangle A3 has the third side of length L3 of the quadrilateral as base and the two lines connecting the pixel location P(x,y) to the two vertices (x3,y3) and (x4,y4) as two sides. The triangle A4 has the fourth side of length L4 of the quadrilateral as base and the two lines connecting the pixel location P(x,y) to the two vertices (x4,y4) and (x1,y1) as two sides.

The area of the quadrilateral (AQ) is determined based on the following:

$$AQ=(x1*y2-x2*y1)+(x2*y3-x3*y2)+(x3*y4-x4*y3)+(x4*y1-x1*y4) \quad (1)$$

The areas of the four triangles are determined based on the following:

$$A1=(x*(y1-y2))+(x1*(y2-y))+(x2*(y-y1)) \quad (2)$$

$$A2=(x*(y2-y3))+(x2*(y3-y))+(x3*(y-y2)) \quad (3)$$

$$A3=(x*(y3-y4))+(x3*(y4-y))+(x4*(y-y3)) \quad (4)$$

$$A4=(x*(y4-y1))+(x4*(y1-y))+(x1*(y-y4)) \quad (5)$$

The area of the quadrilateral is compared to a sum of the areas of the triangles. If the area of the quadrilateral is equal to the sum of the areas of the triangles, the pixel location P(x,y) is inside the quadrilateral. Otherwise, the pixel location P(x,y) is outside the quadrilateral.

If the pixel location P(x,y) is inside the quadrilateral, relative coordinates of the pixel location P(x,y) are computed as percentages a and b of lengths L1 and 14 of the sides of the quadrilateral connected to the vertex (x1,y1), respectively. Since a and b are percentages, $0 \le a \le 1$, and $0 \le b \le 1$. Further, the percentage a of the length L1 is proportional to the percentage a of the length L3, and the percentage b of the length L4 is proportional to the percentage b of the length L2. The relative coordinates a and b of the pixel location P(x,y) are computed using the following equations.

First the four lengths of the quadrilateral are determined based on the following:

$$L1=\text{Sqrt}((x2-x1)^2-(y2-y1)^2) \quad (6)$$

$$L2=\text{Sqrt}((x3-x2)^2-(y3-y2)^2) \quad (7)$$

$$L3=\text{Sqrt}((x4-x3)^2-(y4-y3)^2) \quad (8)$$

$$L3=\text{Sqrt}((x1-x4)^2-(y1-y4)^2) \quad (9)$$

Then a and b are determined based on the following:

$$a=L2*A4/((L4*A2)+(L2*A4)) \quad (10)$$

$$b=L3*A1/((L1*A3)+(L3*A1)) \quad (11)$$

Then, in the source image, a grid location (m,n) corresponding to the grid location (m,n) in the destination image is located. In the grid location (m,n) in the source image, a pixel at coordinates (a,b) is found. The pixel found at coordinates (a,b) in the grid location (m,n) in the source image is mapped to the pixel location P(x,y) in the destination image. This process is repeated for all pixel locations of the destination image. The destination image is formed when the process is completed.

Figure 3A:
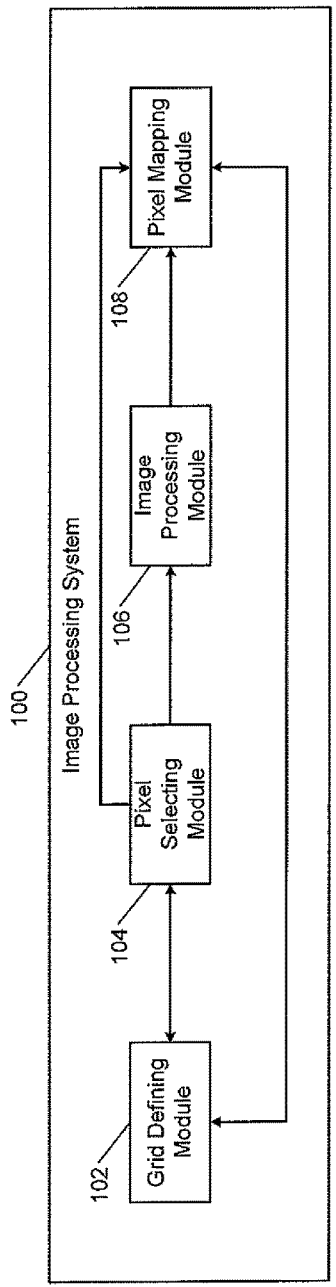
FIG. 3A is a functional block diagram of an image processing system according to the present disclosure.
Figure 3B:
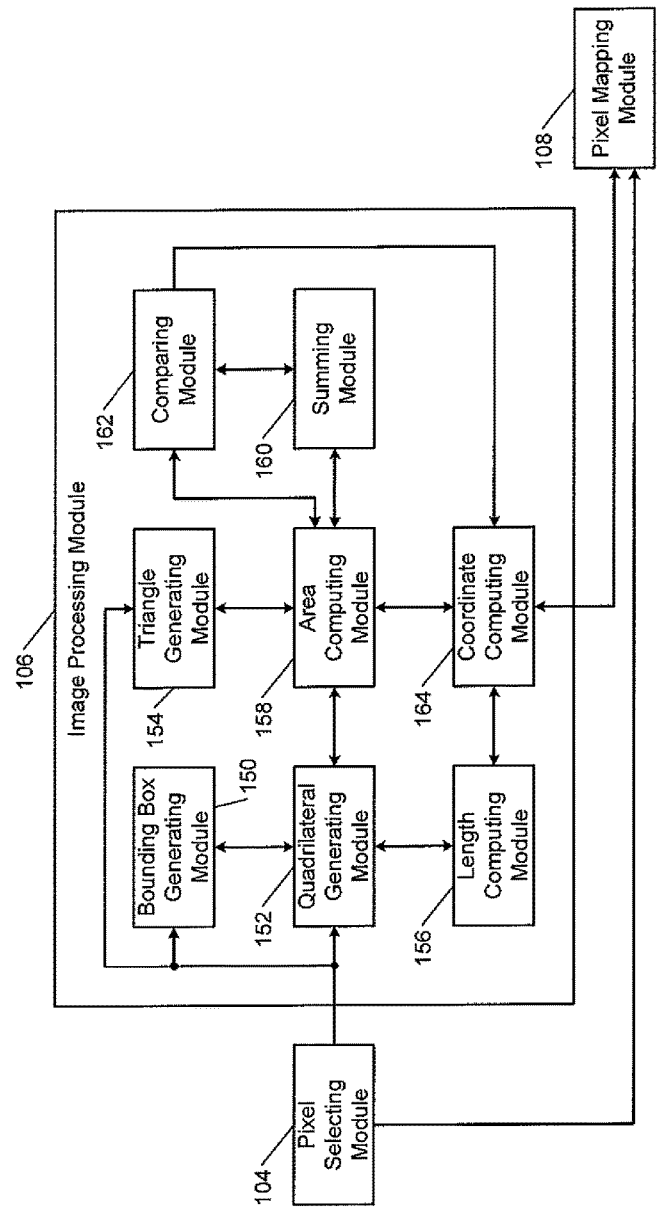
FIG. 3B is a functional block diagram of an image processing module of the image processing system of FIG. 3A.

FIGS. 3A and 3B show a functional block diagram of an image processing system 100 according to the present disclosure. The image processing system 100 transforms a source image into a destination image using the method explained above with reference to FIG. 2.

In FIG. 3A, the image processing system 100 includes a grid defining module 102, a pixel selecting module 104, and image processing module 106, and a pixel mapping module 108. The grid defining module 102 defines an M×N grid for both a source image and a destination image. The pixel selecting module 104 selects a pixel location P(x,y) in a grid location (m,n) in the destination image.

As explained below with reference to FIG. 3B, the image processing module 106 determines a bounding box, a quadrilateral, and triangles for the destination image. The image processing module 106 further determines whether a pixel at location P(x,y) falls inside or outside the quadrilateral. The image processing module 106 further determines the coordinates (a,b) of the pixel location P(x,y) if the pixel location P(x,y) falls inside the quadrilateral.

The pixel mapping module 108 determines a grid location (m,n) location in the source image corresponding to the grid location (m,n) in the destination image. The pixel mapping module 108 locates a pixel in the grid location (m,n) in the source image at coordinates (a,b), and maps the pixel in the grid location (m,n) in the source image at coordinates (a,b) to the pixel location P(x,y) in the destination image.

In FIG. 3B, the image processing module 106 includes a bounding box generating module 150, a quadrilateral generating module 152, a triangle generating module 154, a length computing module 156, an area computing module 158, a summing module 160, a comparing module 162, and a coordinate computing module 164.

The bounding box generating module 150 generates a bounding box using the two diagonally opposite vertices (x1,y1) and (x3,y3) of the grid location (m,n) in the destination image. The quadrilateral generating module 152 generates a quadrilateral with sides of lengths L1, L2, L3, and L4 by connecting the four vertices of the grid location (m,n). The triangle generating module 154 generates the triangles A1, A2, A3, and A4 by connecting the four vertices of the grid location (m,n) to the pixel location P(x,y). The length computing module 156 computes the lengths L1, L2, L3, and L4 of the four sides of the quadrilateral using the equations shown above with reference to FIG. 2.

The area computing module 158 computes the area of the quadrilateral and the areas of the triangles A1, A2, A3, and A4 using the equations shown above with reference to FIG. 2. The summing module 160 generates a sum of the areas of the triangles A1, A2, A3, and A4. The comparing module 162 compares the area of the quadrilateral to the sum of the areas of the triangles and determines whether the pixel location P(x,y) falls inside or outside the quadrilateral. The comparing module 162 determines that the pixel location P(x,y) falls inside the quadrilateral if the area of the quadrilateral is equal to the sum of the areas of the triangles. If the pixel location P(x,y) falls inside the quadrilateral, the coordinate computing module 164 computes the coordinates (a,b) of the pixel location P(x,y) relative to the vertex (x1,y1) using the equations shown above with reference to FIG. 2.

Figure 4A:
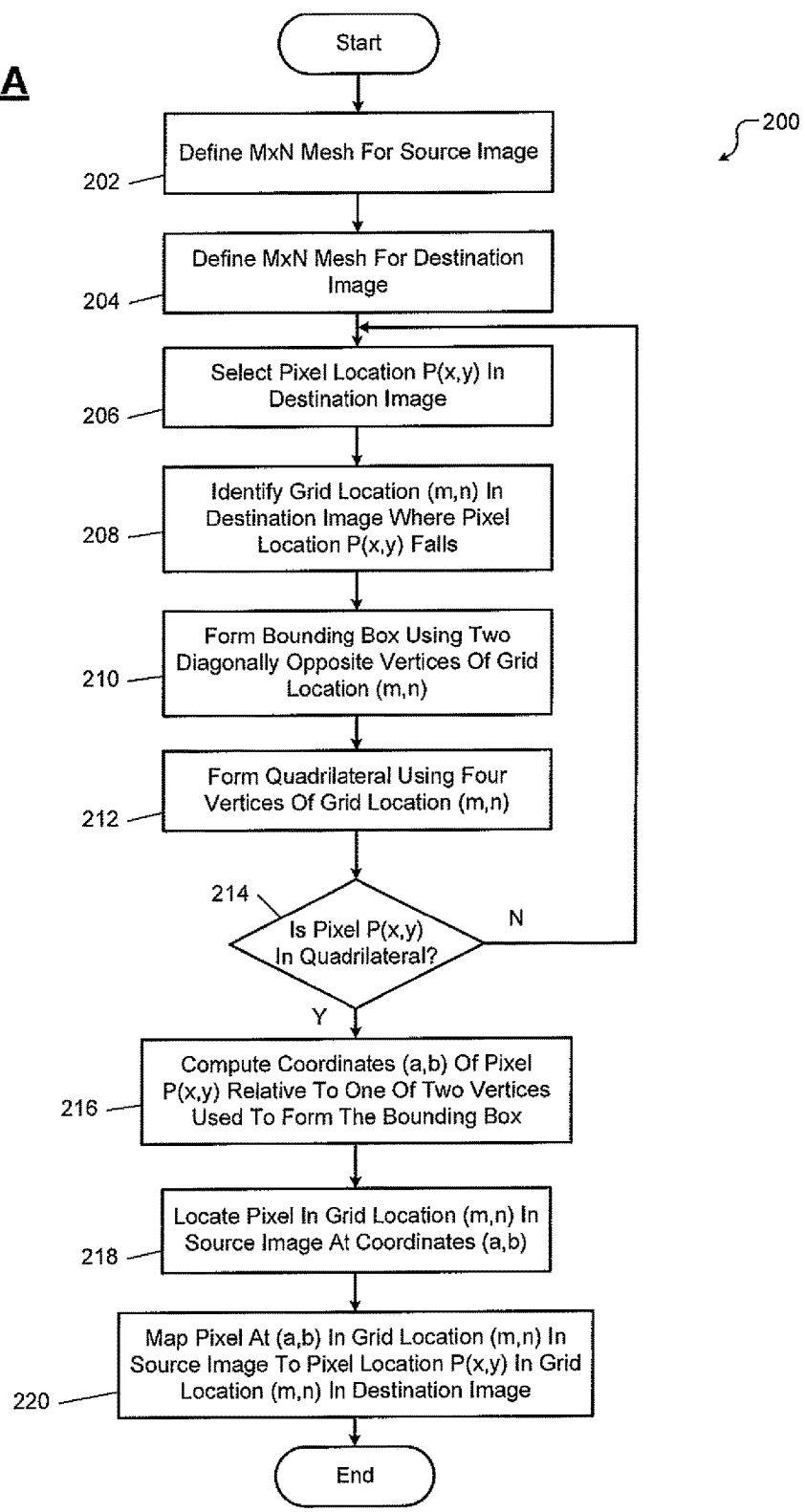
FIG. 4A is a flowchart of a method for transforming a source image into a destination image according to the present disclosure.

FIG. 4A shows a method 200 for transforming a source image into a destination image according to the present disclosure. The method 200 is performed by the image processing system 100 shown in FIGS. 3A and 3B. At 202, an M×N grid for a source image is determined (e.g., by the grid defining module 102). At 204, an M×N grid is defined for a destination image (e.g., by the grid defining module 102). At 206, a pixel location P(x,y) in the destination image is selected (e.g., by the pixel selecting module 104). At 208, a grid location (m,n) is determined in the destination image, where the grid location (m,n) corresponds to the location of the pixel location P(x,y) (e.g., by the pixel selecting module 104).

At 210, a bounding box is determined (e.g., by the bounding box generating module 150) based on two diagonally opposite vertices of the grid location (m,n) (e.g., (x1,y1) and (x3,y3)). At 212, a quadrilateral is determined (e.g., by the quadrilateral generating module 152) based on the four vertices of the grid location (m,n). At 214, whether the pixel location P(x,y) falls inside or outside the quadrilateral is determined (e.g., by the comparing module 162). Control returns to 206 if the pixel location P(x,y) falls outside the quadrilateral.

At 216, if the pixel location P(x,y) falls inside the quadrilateral, the coordinates (a,b) of the pixel location P(x,y) are determined (e.g., by the coordinate computing module 164) relative to one of the two diagonally opposite vertices used to form the bounding box (e.g., (x1,y1)). At 218, a pixel is located (e.g., by the pixel mapping module 108) in grid location (m,n) in the source image at the coordinates (a,b). At 220, the pixel at the coordinates (a,b) in the grid location (m,n) in the source image is mapped (e.g., by the pixel mapping module 108) to the pixel location P(x,y) in the grid location (m,n) in the destination image.

Figure 4B:
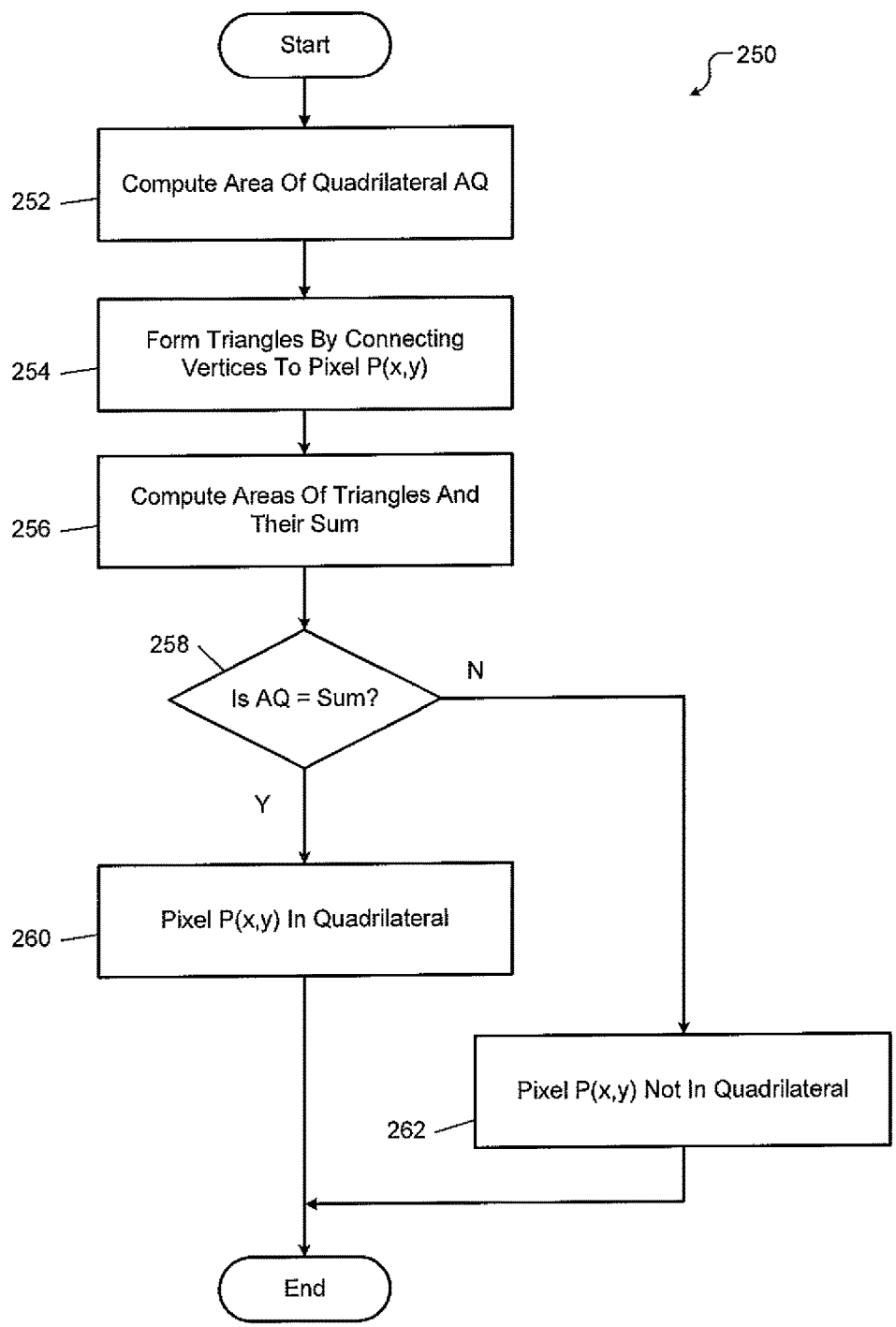
FIG. 4B is a flowchart of a method for determining whether the pixel falls inside or outside a quadrilateral shown in FIG. 2 according to the present disclosure.

FIG. 4B shows a method 250 for determining whether the pixel location P(x,y) falls inside or outside the quadrilateral. At 252, using the equations shown above with reference to FIG. 2, the area of the quadrilateral formed by connecting the four vertices of the grid location (m,n) in the destination image is determined (e.g., by the area computing module 158). At 254, triangles are determined (e.g., by the triangle generating module 154) by connecting the four vertices of the grid location (m,n) to the pixel location P(x,y). At 256, using the equations shown above with reference to FIG. 2, the areas of the triangles and their sum are determined (e.g., the area computing module 158).

At 258, whether the area of the quadrilateral is equal to the sum of the areas of the triangles is determined (e.g., by the comparing module 162). At 260, it is determined (e.g., by the comparing module 162) that the pixel location P(x,y) falls inside the quadrilateral if the area of the quadrilateral is equal to the sum of the areas of the triangles. At 262, it is determined (e.g., by the comparing module 162) that the pixel location P(x,y) falls outside the quadrilateral if the area of the quadrilateral is not equal to the sum of the areas of the triangles.

Figure 4C:
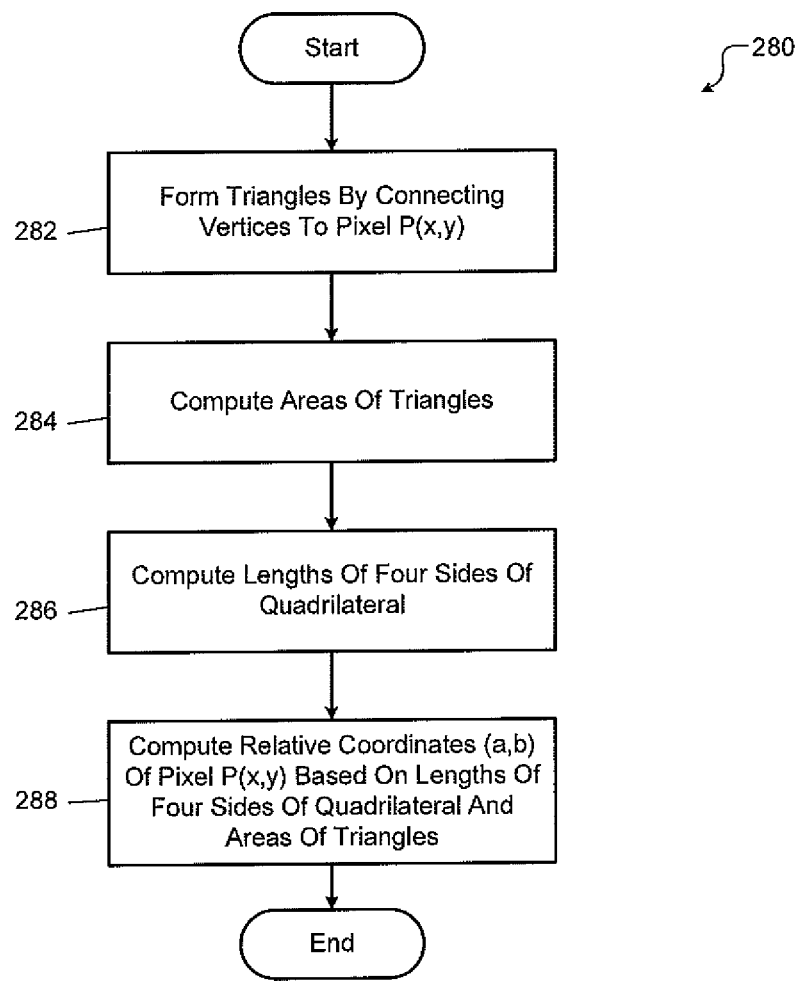
FIG. 4C is a flowchart of a method for computing coordinates of the pixel if the pixel falls inside the quadrilateral shown in FIG. 2 according to the present disclosure In the drawings, reference numbers may be reused to identify similar and/or identical elements.

FIG. 4C shows a method 280 for computing the coordinates (a,b) of the pixel location P(x,y) relative to one of the two diagonally opposite vertices used to form the bounding box (e.g., (x1,y1)). At 282, triangles are determined (e.g., by the triangle generating module 154) by connecting the four vertices of the grid location (m,n) to the pixel location P(x,y). At 284, using the equations shown above with reference to FIG. 2, the areas of the triangles are determined (e.g., by the area computing module 158). At 286, using the equations shown above with reference to FIG. 2, the lengths of the four sides of the quadrilateral are determined (e.g., by the length computing module 156). At 288, using the equations shown above with reference to FIG. 2, the relative coordinates (a,b) of the pixel location P(x,y) are determined (e.g., by the coordinate computing module 164) based on the areas of the triangles and the lengths of the four sides of the quadrilateral.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:
1. A system comprising:
a processor and memory storing instructions that when executed by the processor configure the processor to:
select a first pixel from a first plurality of cells of a destination image, wherein the first pixel is located in a first cell of the first plurality of cells of the destination image;
determine a bounding box around a quadrilateral formed by vertices of the first cell, wherein the first pixel lies in the bounding box;
determine whether the first pixel is located in the quadrilateral;
determine, in response to the first pixel being located in the quadrilateral, coordinates of the first pixel relative to a first vertex of the vertices of the first cell;
identify a second cell of a second plurality of cells of a source image corresponding to the first cell of the first plurality of cells of the destination image;
locate a second pixel in the second cell using the coordinates of the first pixel; and
map the second pixel from the source image to the first pixel in the destination image to output the destination image on a display or a printer, wherein the source and destination images are respectively distorted and undistorted images, or wherein the source and destination images are respectively undistorted and distorted images;
wherein the processor is further configured to determine the coordinates of the first pixel by determining:
a first percentage of a first length of a first side of the quadrilateral connected to the first vertex of the first cell; and
a second percentage of a fourth length of a fourth side of the quadrilateral connected to the first vertex of the first cell; and
wherein the processor is further configured to determine:
the first percentage based on lengths of second and fourth sides of the quadrilateral and areas of second and fourth triangles of four triangles, the four triangles being formed by connecting the vertices of the first cell to a location of the first pixel, and the second and fourth triangles respectively having the second and fourth sides as bases, wherein the second side is connected to the first side and to a second vertex of the vertices of the first cell; and
the second percentage based on lengths of first and third sides of the quadrilateral and areas of first and third of the four triangles having the first and third sides as bases, wherein the third side is connected to the fourth side and to a fourth vertex of the first cell, and wherein the second vertex is diagonally opposite to the fourth vertex.

2. The system of claim 1, wherein the instructions when executed by the processor further configure the processor to define (i) a first grid including the first plurality of cells of the destination image and (ii) a second grid including the second plurality of cells of the source image.

3. The system of claim 1, wherein the instructions when executed by the processor further configure the processor to determine whether the first pixel is located in the quadrilateral based on a first area of the quadrilateral and a second area of a sum of areas of triangles formed by connecting the vertices of the first cell to a location of the first pixel.

4. The system of claim 1, wherein the first plurality of cells and the second plurality of cells are equal in number.

5. The system of claim 1, wherein the instructions when executed by the processor further configure the processor to determine the bounding box using the first vertex and a third vertex of the vertices of the first cell, wherein the third vertex is diagonally opposite to the first vertex.

6. The system of claim 1, wherein the instructions when executed by the processor further configure the processor to determine that the first pixel is located in the quadrilateral when a first area of the quadrilateral is equal to a second area of a sum of areas of triangles formed by connecting the vertices of the first cell to a location of the first pixel.

7. An image processing method for transforming a source image into a destination image, the image processing method comprising:
selecting a first pixel from a first plurality of cells of a destination image, wherein the first pixel is located in a first cell of the first plurality of cells of the destination image;
determining a bounding box around a quadrilateral formed by vertices of the first cell, wherein the first pixel lies in the bounding box;
determining whether the first pixel is located in the quadrilateral;
determining, in response to the first pixel being located in the quadrilateral, coordinates of the first pixel relative to a first vertex of the vertices of the first cell;
identifying a second cell of a second plurality of cells of the source image corresponding to the first cell of the first plurality of cells of the destination image;
locating a second pixel in the second cell using the coordinates of the first pixel; and
mapping the second pixel from the source image to the first pixel in the destination image to output the destination image on a display or a printer, wherein the source and destination images are respectively distorted and undistorted images, or wherein the source and destination images are respectively undistorted and distorted images,
the method further comprising determining the coordinates of the first pixel by:
determining a first percentage of a first length of a first side of the quadrilateral connected to the first vertex of the first cell; and
determining a second percentage of a fourth length of a fourth side of the quadrilateral connected to the first vertex of the first cell; and
the method further comprising determining:
the first percentage based on lengths of second and fourth sides of the quadrilateral and areas of second and fourth triangles of four triangles, the four triangles being formed by connecting the vertices of the first cell to a location of the first pixel and the second and fourth triangles respectively having the second and fourth sides as bases, wherein the second side is connected to the first side and to a second vertex of the vertices of the first cell; and
the second percentage based on lengths of first and third sides of the quadrilateral and areas of first and third of the four triangles having the first and third sides as bases, wherein the third side is connected to the fourth side and to a fourth vertex of the first cell, and wherein the second vertex is diagonally opposite to the fourth vertex.

8. The method of claim 7, further comprising:
defining a first grid including the first plurality of cells of the destination image; and
defining a second grid including the second plurality of cells of the source image.

9. The method of claim 7, further comprising determining whether the first pixel is located in the quadrilateral based on whether an area of the area of the quadrilateral is equal to a sum of areas of triangles formed by connecting the vertices of the first cell to a location of the first pixel.

10. The image processing method of claim 7, wherein the first plurality of cells and the second plurality of cells are equal in number.

11. The image processing method of claim 7, further comprising determining the bounding box using the first vertex and a third vertex of the vertices of the first cell, wherein the third vertex is diagonally opposite to the first vertex.

12. The image processing method of claim 7, further comprising determining that the first pixel is located in the quadrilateral when a first area of the quadrilateral is equal to a second area of a sum of areas of triangles formed by connecting the vertices of the first cell to a location of the first pixel.

* * * * *